US 9,390,750 B1

United States Patent
Dawson et al.

(10) Patent No.: US 9,390,750 B1
(45) Date of Patent: Jul. 12, 2016

(54) TAPE VOLUME OVERWRITE PROTECTION DURING ERROR RECOVERY

(71) Applicant: International Business Machines Corporation, Armonk, NY (US)

(72) Inventors: Erika M. Dawson, Tucson, AZ (US); David C. Reed, Tucson, AZ (US); Max D. Smith, Tucson, AZ (US); Joseph M. Swingler, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/676,666

(22) Filed: Apr. 1, 2015

(51) Int. Cl.
*G11B 27/36* (2006.01)
*G11B 5/09* (2006.01)
*G11B 20/00* (2006.01)
*G11B 5/008* (2006.01)
*G11B 20/18* (2006.01)
*G11B 15/20* (2006.01)

(52) U.S. Cl.
CPC ...... *G11B 20/00702* (2013.01); *G11B 5/00813* (2013.01); *G11B 15/20* (2013.01); *G11B 20/18* (2013.01)

(58) Field of Classification Search
CPC ........ G11B 15/442; G11B 5/52; G11B 5/012; G11B 27/36; G11B 5/02; G11B 2220/20; G11B 27/3027; G11B 2220/90; G11B 20/18; G11B 15/52; G11B 15/1872
USPC ......... 360/25, 31, 39, 48, 53, 72.1, 73.04, 83, 360/90
See application file for complete search history.

(56) References Cited

U.S. PATENT DOCUMENTS

| | | |
|---|---|---|
| 6,779,080 B2 | 8/2004 | Basham et al. |
| 6,898,036 B2 | 5/2005 | Gill et al. |
| 7,650,461 B2 | 1/2010 | Dahman et al. |
| 7,739,577 B2 * | 6/2010 | Earhart ............... G11B 20/1217 714/755 |
| 7,880,993 B2 | 2/2011 | Masuda et al. |
| 8,693,128 B2 | 4/2014 | Masuda et al. |
| 2012/0198289 A1 | 8/2012 | Hostetter et al. |

* cited by examiner

*Primary Examiner* — Nabil Hindi
(74) *Attorney, Agent, or Firm* — Zilka-Kotab, PC

(57) ABSTRACT

In one embodiment, a method includes detecting an error while writing data to a tape volume. The method further includes repositioning the tape volume for recovering from the error, and receiving, after the repositioning, at least a portion of the data for rewriting the at least a portion of the data to the tape volume. Further, the method includes determining, after the repositioning, a current position of the tape volume. Additionally, the method includes determining, based on the current position of the tape volume, whether the rewrite to the tape volume is allowed.

20 Claims, 3 Drawing Sheets

TAPE VOLUME OVERWRITE PROTECTION DURING ERROR RECOVERY

BACKGROUND

The present invention relates to data storage systems, and more particularly, this invention relates to preventing data overwrite during error recovery.

During write operations to a physical or virtual tape volume, errors may occur that require repositioning a write head to a prior position on the tape volume. As a result of the repositioning, the write head may be positioned over previously written data, such as at the beginning of the tape volume. Under some circumstances, the write head may resume writing operations to the tape volume while still positioned over the previously written data, resulting in an overwrite of the previously written data. Unfortunately, the data may be lost as a result of the overwriting.

Depending on the circumstances of the overwrite, and the type of the tape volume, recovery of the data may be possible. However, in other circumstances the overwrite will result an actual loss of the data. This may be especially true in a disk-only virtual tape environment, because any write attempt at the beginning of the volume will cause a disk file representing the tape volume to be truncated. In such situations, any ability to recover the overwritten data may then depend on other backups that exist, such as on other disks and/or tapes. Even when other backups do exist, recovering lost data often consumes a significant amount of time and effort.

BRIEF SUMMARY

A method according to one embodiment includes detecting an error while writing data to a tape volume, repositioning the tape volume for recovering from the error, and receiving, after the repositioning, at least a portion of the data for rewriting the at least a portion of the data to the tape volume. Further, the method includes determining, after the repositioning, a current position of the tape volume, and determining, based on the current position of the tape volume, whether the rewrite to the tape volume is allowed.

A system according to one embodiment includes a processor and logic integrated with and/or executable by the processor. The logic is configured to cause the foregoing method to occur.

A computer program product according to one embodiment includes a computer readable storage medium having program instructions embodied therewith, the program instructions readable and/or executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head. Further, any of these embodiments may be implemented in a virtualized tape system.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. For example, various embodiments disclosed herein are able to prevent overwriting of data stored to a tape volume. In various embodiments, upon receiving a write command, a tape drive described below may only allow the write to a tape volume if a write head is positioned at an acceptable location on the tape volume, e.g., to prevent any unwanted overwrite of data resulting from a prior tape volume rewind.

In one general embodiment, a method includes detecting an error while writing data to a tape volume, repositioning the tape volume for recovering from the error, and receiving, after the repositioning, at least a portion of the data for rewriting the at least a portion of the data to the tape volume. Further, the method includes determining, after the repositioning, a current position of the tape volume, and determining, based on the current position of the tape volume, whether the rewrite to the tape volume is allowed.

In another general embodiment, a system includes a processor and logic integrated with and/or executable by the processor. The logic is configured to cause the foregoing method to occur.

In yet another general embodiment, a computer program product includes a computer readable storage medium having program instructions embodied therewith, the program instructions readable and/or executable by a controller to cause the controller to perform the foregoing method.

Various embodiments may be implemented in a standalone system, such as in a tape drive that may be coupled to a host. In other approaches, the system may be implemented in an automated data storage library or a virtual tape volume.

Figure 1:
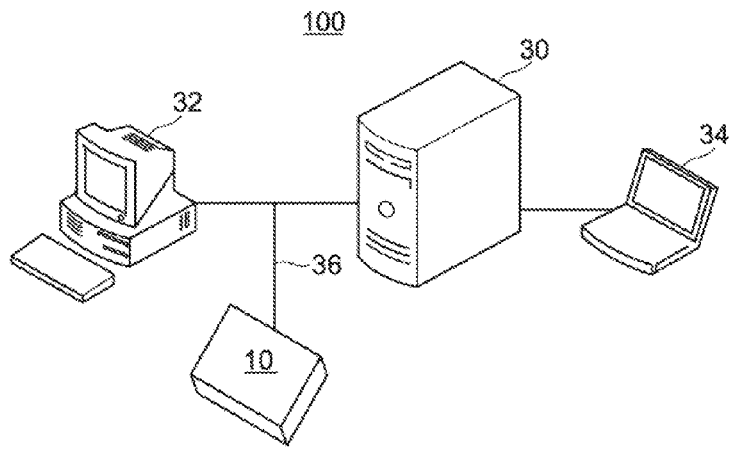
FIG. 1 is a diagram showing a configuration example of system utilizing a tape drive, in accordance with one embodiment.

Referring now to FIG. 1, an exemplary configuration of an operating environment 100 is shown. The operating environment 100 is configured to include a tape drive 10, a host (server) 30, and PCs (terminals) 32, 34, which are communicable with one another through a network 36. The tape drive 10 and the host (server) 30 are each illustrated as one component in FIG. 1, but this is just an example. Two or more tape drives 10 and hosts (servers) 30 may be included.

Figure 2:
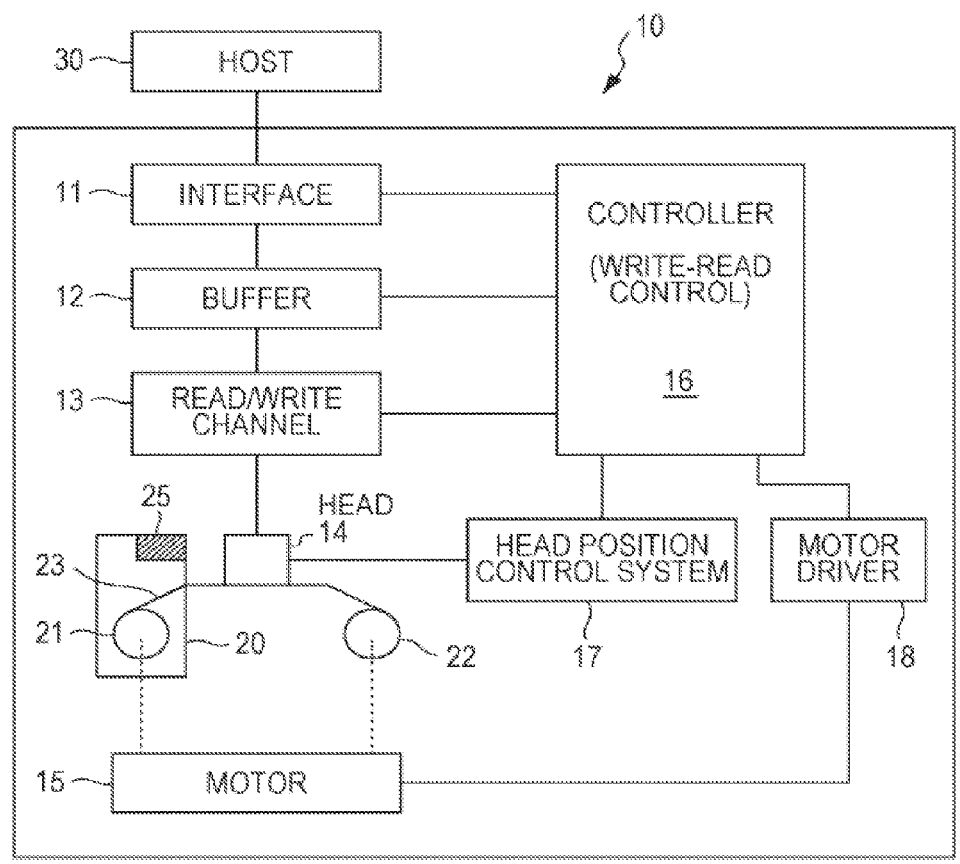
FIG. 2 is an illustration of a tape drive, in accordance with an embodiment.

FIG. 2 is a diagram showing a configuration example of the tape drive 10, in accordance with one embodiment. As shown in FIG. 2, the tape drive 10 includes a host interface (hereinafter called "host I/F") 11, a buffer 12, a channel 13, a head 14, and a motor 15. The tape drive 10 also includes a controller 16, a head position control system 17, and a motor driver 18. Since a tape cartridge 20 is loadable when the tape cartridge 20 is inserted into the tape drive 10, the tape cartridge 20 is further shown here. This tape cartridge 20 includes a tape 23 wound on reels 21 and 22. The tape 23 moves in a longitudinal direction with the rotation of the reels 21 and 22 from the reel 21 to the reel 22, or from the reel 22 to the reel 21. A magnetic tape is exemplified as the tape 23, but the tape 23 may be any magnetic medium other than the magnetic tape.

The host I/F 11 may communicate with the host (server) 30 or the other terminals 32, 34. For example, the host I/F 11 may receive, from an operating system (OS) of the host 30, a command to instruct writing of data to the tape 23, a command to move the tape 23 to a target position, and a command to instruct reading of data from the tape 23.

The buffer 12 may be a memory for accumulating data to be written to the tape 23 and data read from the tape 23. For example, the buffer 12 may include a DRAM. The buffer 12 may be composed of multiple buffer segments, and each buffer segment may store a data set as a unit of read/write from/to the tape 23.

The channel 13 is a communication channel that may be used to send the head 14 data to be written to the tape 23 and receive, from the head 14, data read from the tape 23. The head 14 may write information to the tape 23 and read information from the tape 23 when the tape 23 moves in the longitudinal direction. The motor 15 may drive the reels 21 and 22 to rotate. Although the motor 15 is illustrated as a singular motor in FIG. 2, it may be preferable to provide, as the motor 15, two motors, such as a motor for each of the reels 21 and 22.

The controller 16 may control the entire tape drive 10. For example, the controller 16 may control writing to the tape 23 and reading from the tape 23 according to the commands accepted at the host I/F 11. The controller 16 may also control the head position control system 17 and the motor driver 18. The head position control system 17 may track a desired wrap, where the wrap may include a group of multiple tracks on the tape 23. When it is necessary to switch from one wrap to another, the head 14 may also need to be electrically switched. Such switching may be controlled by this head position control system 17.

The motor driver 18 may drive the motor 15. As mentioned above, if two motors 15 are used, two motor drivers 18 may also be provided.

As shown in FIG. 2, the tape drive 10 is a physical tape drive for receiving and reading/writing a tape cartridge 20. Of course, in other embodiments the tape drive 10 may be a virtualized or virtual tape drive. In such embodiments, the tape drive 10 may include a logical construct, such as software, that appears to the host 30 as an actual tape drive. Data may be read from or written to logical volumes of the tape drive 10, whether an actual tape drive or a virtual tape drive, through a read/write channel as is well known to those skilled in the art.

In embodiments employing a virtual tape drive, logical volumes may be stored on different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). An example of a storage cartridge is a magnetic tape cartridge, which includes a rewritable magnetic tape wound on a hub of reel, and a cartridge memory. One example of a magnetic tape cartridge includes a cartridge based on LTO (Linear Tape Open) technology. Utilizing a virtual tape drive may allow access to logical volumes at disk speeds while maintaining compatibility with existing tape operations.

For simplicity, the instant description may describe methods and systems as utilizing a tape drive. It is understood that the tape drive utilized by these methods and systems is intended to include both actual tape drives and virtual tape drives. Thus, references to a "tape drive" are intended to include an actual tape drive, as well as software appearing to a host as a physical tape drive. Additionally, for simplicity, the instant description may describe methods and systems as utilizing a tape volume. It is understood that the tape volume utilized by these systems and methods is intended to include tape cartridges, as well as logical volumes stored on different physical media that appear to a host as being mounted via a tape drive.

Various embodiments disclosed herein are desirably able to protect data stored on a tape volume from being overwritten as a result of rewind operations performed during error recovery processes. Specifically, by determining a current tape position, it may be determined if a pending write operation will be performed at an allowed location on a tape volume, as will be described in further detail below.

Figure 3:
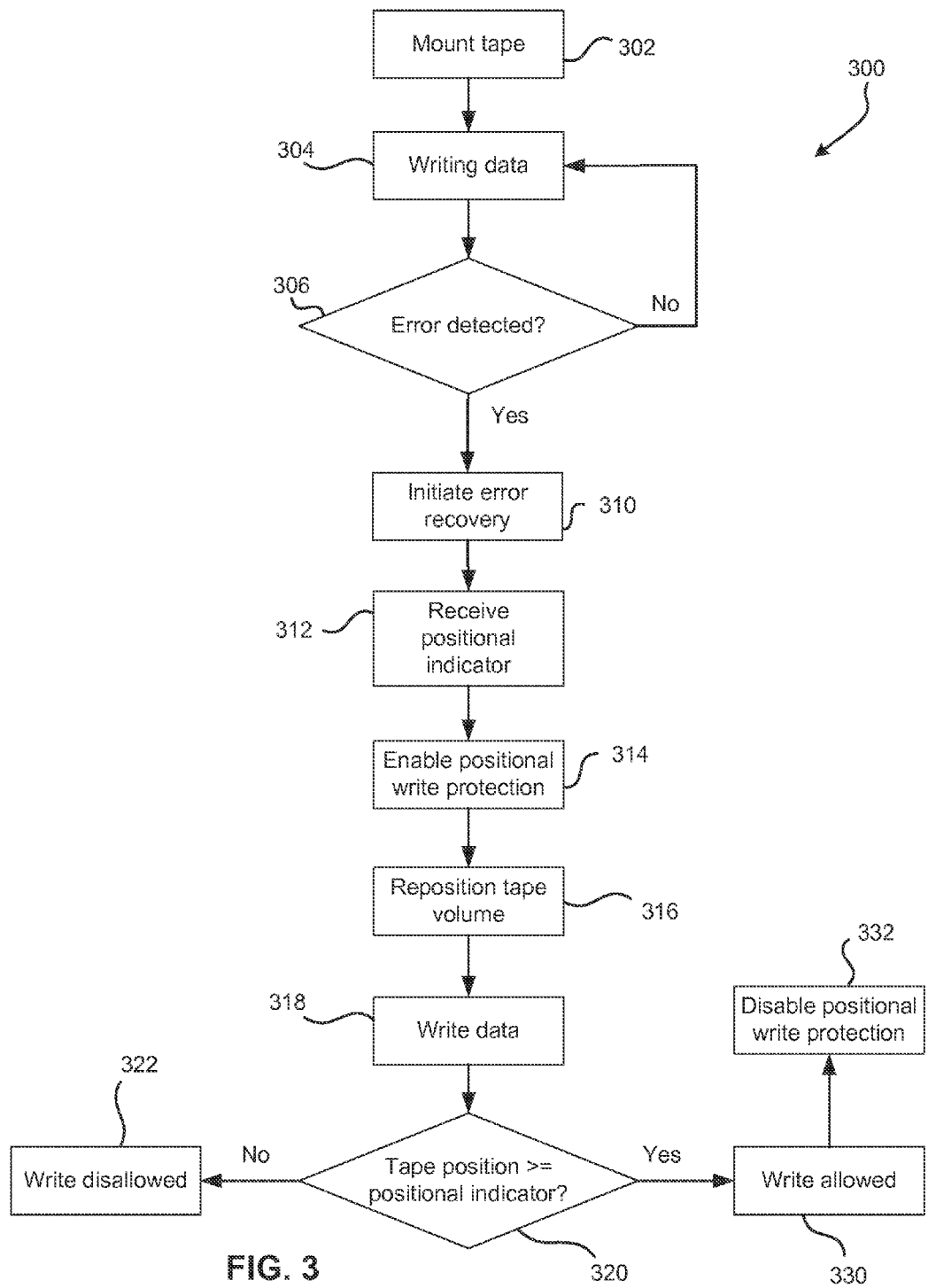
FIG. 3 illustrates a method for tape volume overwrite protection during error recovery, according to one embodiment.

Referring now to FIG. 3, a flowchart of a method 300 is shown according to one embodiment. The method 300 may be performed in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a tape drive. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Further still, any one or more of the operations of method 300 may be implemented in one or more tape drives using microcode embodied therewith. In some approaches, one or more of the operations of method 300 may be implemented in a system having a processor and logic integrated with and/or executable by the processor, the logic being configured to perform the one or more operations of method 300. It follows that any of the approaches described herein may be applied to physical and/or logical tape systems depending on the desired embodiment.

Referring now to FIG. 3, method 300 begins with operation 302, at which a tape volume is mounted. The tape volume may be mounted due to any command that is associated with a mount command. For example, the tape volume may be mounted as a result of a read command, write command, etc., which may come from a host, computer, etc. In one embodiment, the tape volume may be a volume on a physical tape that is mounted by an actual tape drive. In another embodiment, the tape volume may be a volume on a virtual tape drive.

After mounting the tape volume at operation 302, data is written to the tape volume at operation 304. The data written to the tape volume at operation 304 may include any data, such as, for example, user data or system data. Further, the data written to the tape volume may be received from a host, such as from an application executing on the host.

Further, at operation 306, a determination is made as to whether an error has occurred while writing the data to the tape volume. In one embodiment, the error may comprise any error that results in a recovery process that includes a rewind of the tape volume. For example, the error may include a channel-type issue. Thus, at operation 306, it may be determined whether an error has occurred that will result in the tape volume being rewound. In some embodiments, error codes and/or unit checks may be utilized to determine whether an error has occurred at the tape drive. Examples of such errors include channel errors, such as on the read/write channel 13. In one embodiment, the error detected at operation 306 may comprise an interface control check, which may indicate that an incorrect signal has occurred on a channel path.

When an error has been detected at operation 306, the tape drive may remain at the location on the tape volume where the error was detected until any further instructions are received. For example, host recovery efforts and/or system software may determine which, if any, post-error operations the tape drive is to perform.

In one embodiment, the tape drive may notify a host of the error detected at operation 306. The notification may be in the form of a unit check sent from the tape drive. Moreover, in some approaches, the unit check may include a fault system code that includes a system message indicating the cause of the detected error.

If, at operation 306, it is determined that an error has not occurred, then data continues to be written to the tape volume.

However, if, at operation 306, it is determined that an error has occurred, then error recovery is initiated at operation 310. Error recovery may include any predetermined method, such as preprogrammed instructions, or a determined on-the-fly method to rectify the error detected at operation 306. In some embodiments, initiating error recovery at operation 310 may include error recovery code gaining control of the tape drive as a result of the detected error. The error recovery code may be a part of an OS of the host, such that error recovery code of the host's OS may gain control of the tape drive in response to a unit check from the tape drive.

In one embodiment, the error recovery initiated at operation 310 includes the tape drive receiving one or more commands from a host. For example, the tape drive may receive one or more commands from the error recovery code on the host, as set forth in more detail below.

Next, at operation 312, a positional indicator is received by the tape drive. In one embodiment, a host passes the positional indicator to the tape drive. In such an embodiment, the positional indicator may be passed to the tape drive from software on the host. For example, the positional indicator may be passed to the tape drive from the recovery code of the host's OS. The positional indicator may include any value that the tape drive may use to identify a relative or absolute position on the mounted tape volume. In some embodiments, the positional indicator may include a relative or absolute position of a write head in relation to the tape volume. For example, the positional indicator may include a logical address, or a linear position (LPOS) value and/or a horizontal position (HPOS) value. Moreover, the positional indicator may include a block identifier, or address in the form of a bit value, hex value, etc. Still yet, the positional indicator may include a value that is relative to another predetermined position of the tape volume, such as a beginning of the tape volume, or an end of the tape volume. In another embodiment, the positional indicator may be determined by the tape drive based on a location of the error detected at operation 306.

In one embodiment, the positional indicator received at operation 312 may indicate a position on the tape volume where the host will attempt rewriting a failed channel program. Thus, host software, such as error recovery code of the host's OS, may track write positioning on the tape volume during write operation 304 for subsequently determining a location at which an error detected at operation 306 has occurred.

Further, in various embodiments, the positional indicator may be included in a command that is passed from the host to the tape drive. For example, the positional indicator may be included in a channel command word. In one approach, the positional indicator may be a block identifier included in the channel command word.

In embodiments where the positional indicator is included in a command that is passed from the host, the command may be passed before any recovery rewind occurs. Passing the positional indicator ahead of performing recovery rewind may ensure that it is not possible to write to the tape volume from the beginning of the tape volume, or from any other position that is earlier than a position specified by the positional indicator. If an issue were to occur and be undetected during a tape rewind or tape repositioning, the tape may be positioned at an unexpected location without the error recovery code being aware of the mistaken positioning. In such a scenario, if an application that is writing data to the tape volume were to have additional buffers in system memory ready to be written, and those buffers were written at the unexpected location, then data on the tape could be unintentionally overwritten, resulting in potentially catastrophic data loss.

Still yet, at operation 314, positional write protection is enabled. In one embodiment, the positional write protection may be enabled in response to receiving the positional indicator received at operation 312. In another embodiment, the positional write protection may be enabled in response to the error recovery initiated at operation 310. Further still, the positional write protection may be enabled in response to a combination of receiving the positional indicator received at operation 312 and initiating the error recovery at operation 310. In yet another embodiment, the positional write protection may be enabled in response to an enabling command received from a host.

The positional write protection may be enabled at the tape drive. Further, the positional write protection may be a temporary write protection that is enabled on the tape drive for a finite period of time, and which prevents writing to the tape volume at one or more regions of the tape volume.

After the positional write protection is enabled at operation 314, the mounted tape volume is repositioned at operation 316. In one embodiment, repositioning the tape volume at operation 316 may include rewinding the tape volume to a specific point on the volume. In another embodiment, repositioning the tape volume at operation 316 may include rewinding the tape volume to a known position, such as a beginning of the tape volume or a load point, and then positioning the tape volume out to a given position. The given position may include a point on the tape volume that is subsequent to the beginning of the tape volume or the load point, and at which a failed channel program should be retried. In this way, the tape drive may retry a failed channel program at a given position on a repositioned tape volume.

In one embodiment, the error recovery code of the host may provide instructions or commands to the tape drive for rewinding the tape volume and/or repositioning the tape volume.

In the various embodiments where an error has occurred on a channel, such as an interface control check, the tape volume may be rewound, and then repositioned to where a failing channel program can be reissued or retried. When the tape volume is rewound, the tape volume may be rewound to a known position, such as a load point. Further, the tape volume may be repositioned back at the location the tape volume was at prior to the error occurring. Thus, the tape volume may be repositioned to the same block identifier where an error occurred.

In embodiments employing a physical tape volume, this may include rewinding a physical tape, such as the tape 23 using the motor 15, to a desired position. In embodiments employing a virtual tape volume, this may include repositioning a read/write head to a desired position of a physical entity utilized in virtualizing the tape volume. Implementation of such embodiments may require converting a given logical or tape position to a meaningful position for interpretation by a controller of the virtual tape volume.

At operation 318 a host attempts to write data to the mounted tape volume. In one embodiment, the tape drive may receive from the host at least a portion of the failed data from the write operation 304 that resulted in the detected error, so that the tape drive may attempt rewriting at least a portion of the data to the tape volume. In particular, the host may attempt to write at least a portion of the data as a part of reissuing a failed channel program. In other words, the host may attempt to reissue a failed channel program by, at least in part, issuing a write command to the tape drive. Thus, the host may again attempt to write the data that it previously tried to write when an issue occurred and an error was detected at operation 306. Further, the data that the host again attempts to write may be based on the detected error.

In response to the host attempting to write the data at operation 318, the tape drive determines, at operation 320, whether a current tape position is greater than or equal to the positional indicator received at operation 312. For example, the tape drive may read a current tape position of the tape volume, and then compare the read position to the positional indicator received at operation 312. As noted above, the tape drive and/or the host may constantly track the current tape position.

Determining the current tape position may comprise determining a current location of a magnetic medium storing the tape volume relative to transducers intended to perform a read or write command to the magnetic medium. For example, in an embodiment where the tape drive is an actual tape drive, determining the current tape position may include determining a current location of the magnetic tape relative to transducers intended to perform a read or write command. Thus, the "current tape position" may be the location where the writing requested by the write command will be performed if allowed. As noted above, the current tape position may be determined in any conventional manner, such as by reading Linear Position (LPOS) data from the servo tracks of the tape, determining a block identifier of the last written data block and/or of the data block to be written, etc.

Accordingly, the current tape position may include a position on the tape volume, such as a block identifier, that would be written to in response to a write command, or would be read from in response to a read command.

If, at operation 320, it is determined that the current tape position is not greater than or equal to the positional indicator received at operation 312, then at operation 322 the write of operation 318 is not allowed. Thus, if the tape drive receives a write command when the current tape position is earlier than a specified positional offset (e.g., at an earlier block identifier, etc.), the write command is failed. The current tape position may be earlier than the specified positional offset as a result of failing to properly reposition the tape volume at operation 316. This may occur if the tape volume is not positioned back out after a recovery rewind to a known position. The current tape position may be earlier than the specified positional offset as a result of a hardware failure. For example, if something prevents the tape volume from being rewound.

By way of a specific example, the current tape position may be at the beginning of the tape volume due to a software or hardware issue, and the beginning of the tape volume is earlier than the positional indicator received at operation 312. Consequently, at operation 322, a write operation is failed or disallowed based on the comparison, at operation 320, of the current tape position to the previously received positional indicator. Upon failing the write operation, the tape drive may inform the host of the rejection.

In this manner, data is prevented from being written to a tape volume at a location that is prior to a previously identified positional indicator, and data previously written to the tape volume is kept intact in the event of a repositioning failure during a recovery process.

However, if at operation 320, it is determined that the current tape position is greater than or equal to the received positional indicator, then at operation 330 the data of operation 318 is allowed written. As noted above, this data may include data from a failed channel program. Accordingly, data from previously failed channel program may be written to the tape volume only when the current tape position is greater than or equal to the previously received positional indicator (e.g., block identifier, etc.). By ensuring that the data from the previously failed channel program is only written when the current tape position is greater than or equal to the previously received positional indicator, otherwise undesirable overwrite of data the on the tape volume may be prevented.

Further, in response to determining that the write is allowed at operation 330, positional write protection is then disabled at operation 332. Disabling the positional write protection at operation 332 may allow a controlling device or host to continue to write to the mounted tape volume. In view of the above, a temporary position-based soft WORM enablement mechanism may be triggered by a recovery and/or rewind during a recovery process.

Figure 4:
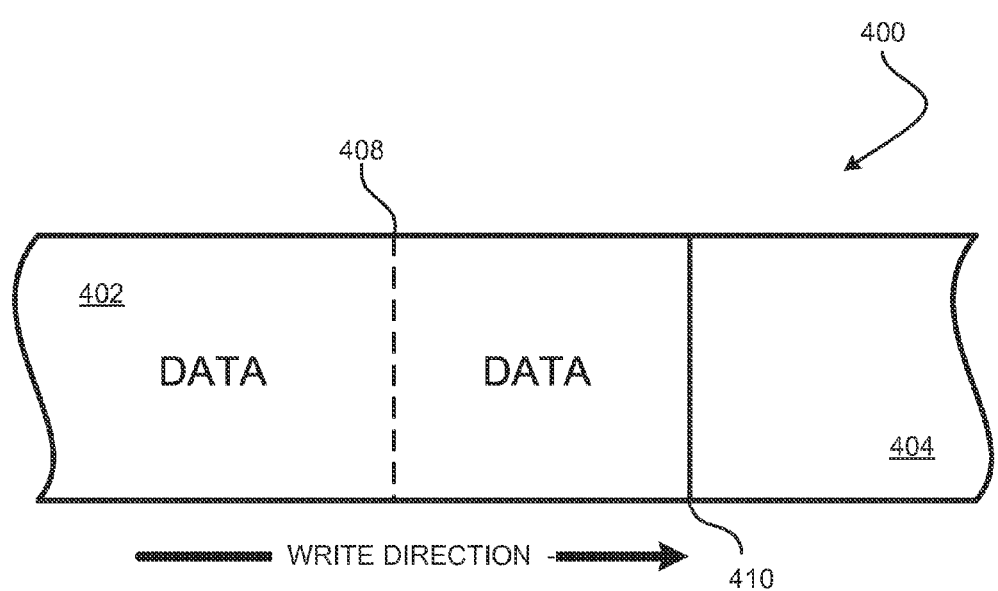
FIG. 4 is a diagrammatic representation of a tape volume, in accordance with one embodiment.

Referring now to FIG. 4, a diagrammatic representation of a tape volume 400 is shown, in accordance with one embodiment. As an option, the tape volume 400 may be implemented in conjunction with features from any other embodiment listed herein, such as those described with reference to the other FIGS. Of course, however, such tape volume 400 and others presented herein may be used in various applications and/or in permutations which may or may not be specifically described in the illustrative embodiments listed herein. Further, the tape volume 400 presented herein may be used in any desired environment.

In one embodiment, the tape volume 400 may be on a tape cartridge that has been inserted into an actual tape drive. In another embodiment, the tape volume 400 may comprise a virtualized tape. As noted previously, in such an embodiment, logical volumes may be stored on different physical media, including, but not limited to, storage cartridges, disk drives, solid state disks (SSD), disks direct access storage devices (DASD), magnetic tape drives, libraries, and disk drive arrays, such as RAID (redundant array of independent disks), or JBOD (just a bunch of disks). Further, it is understood that the diagrammatic representation of the tape volume 400 of FIG. 4 is simplified for aiding in the present disclosure.

Additionally, as illustrated in FIG. 4, data 402 is laid out on the tape volume 400 in a write direction. The write direction may comprise a direction in which data is appended to the tape volume 400 by a tape drive. Accordingly, the tape volume 400 includes previously written data 402, as well as unwritten region 404. During writing of the data 402, an error may be encountered that results in initiation of error recovery. For example, an interface control check may be encountered, and recovery logic may be initiated in response to encountering the interface control check.

As a part of the recovery logic, a positional indicator for a first position 410 on the tape volume 400 may be received the tape drive. Further, after receiving the positional indicator for the first position 410, write protection may be enabled for the tape volume 400, and the tape volume 400 may be repositioned with respect to a write head of the tape drive. As a result of enabling write protection, the positional indicator for the first position 410 may be used by the tape drive to prevent the writing of data to any location on the tape volume 400 that precedes the first position 410.

In one embodiment, the positional indicator for the first position 410 may include a block identifier that coincides with the first position 410 on the tape volume 400. Further, in such an embodiment, the recovery logic may attempt to retry a failed channel program on the tape volume 400. More specifically, the recovery logic may attempt to rewrite the data to the tape volume 400 that resulted in the encountered error.

In some scenarios, the repositioning of the tape volume 400 may not successfully reposition the tape volume 400 with respect to the write head of the tape drive. In other words, the repositioning of the tape volume 400 may result in the write head of the tape drive being located at a block identifier of the tape volume 400 that is earlier than where the channel program is to be retried. Further, the recovery logic may not be aware of the positioning problem.

In response to the recovery logic retrying the failed channel program on the tape volume 400, the tape drive may compare a current position of the tape volume 400 to the previously received positional indicator of the first position 410. If the current position of the tape volume 400 is greater than or equal to the previously received positional indicator of the first position 410, then the tape drive will allow the retried channel program.

However, if the recovery logic were to send data to be written to the tape volume 400 when a write head of the tape drive is located at second position 408, which would be associated with a block identifier that is earlier than the block identifier that coincides with the first position 410, the write by the host would be disallowed. Thus the tape drive may use the positional indicator to prevent a host from inadvertently overwriting data during a recovery operation.

The various embodiments described above preferably include drive microcode that is able to determine a current location on a tape volume. Moreover, the microcode is able to compare the determined current location on the tape volume with a previously received positional indicator, and disallow any received write commands that would result in a write to the tape volume that is earlier than positional indicator in order to protect data previously written to the tape volume from being overwritten.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   detecting an error while writing data to a tape volume;
   repositioning the tape volume for recovering from the error;
   receiving, after the repositioning, at least a portion of the data for rewriting the at least a portion of the data to the tape volume;
   determining, after the repositioning, a current position of the tape volume; and
   determining, based on the current position of the tape volume, whether the rewrite to the tape volume is allowed.

2. The method of claim 1, wherein the error includes an interface control check.

3. The method of claim 2, comprising receiving a positional indicator prior to repositioning the tape volume.

4. The method of claim 3, comprising enabling positional write protection in response to receiving the positional indicator, wherein the positional write protection is enabled prior to repositioning the tape volume.

5. The method of claim 4, wherein the current position of the tape volume is tracked.

6. The method of claim 5, wherein the at least a portion of the data is received from a host.

7. The method of claim 6, wherein the at least a portion of the data is received from recovery code of the host, and wherein the at least a portion of the data is based on the detected error.

8. The method of claim 6, wherein the rewrite to the tape volume comprises retrying a failed channel program.

9. The method of claim 8, wherein retrying the failed channel program is allowed in response to determining that the current position of the tape volume is greater than or equal to the positional indicator.

10. The method of claim 9, wherein the positional indicator comprises a first block identifier of the tape volume, and the current position comprises a second block identifier of the tape volume.

11. The method of claim 9, comprising disabling the positional write protection in response to allowing the retry of the failed channel program.

12. The method of claim 9, wherein retrying the failed channel program is disallowed in response to determining that the current position of the tape volume is less than the positional indicator.

13. The method of claim 12, wherein repositioning the tape volume for recovering from the error includes rewinding the tape volume.

14. The method of claim 13, wherein repositioning the tape volume for recovering from the error includes positioning the tape volume out to a known position.

15. The method of claim 12, wherein the tape volume comprises a logical volume stored on a tape cartridge.

16. The method of claim 12, wherein the tape volume comprises a logical volume stored on a physical medium that appears to the host as being mounted via a tape drive.

17. An apparatus, comprising a processor and logic integrated with and/or executable by the processor, the logic being configured to cause the processor to:
 detect an error while writing data to a tape volume;
 reposition the tape volume for recovering from the error;
 receive, after the repositioning, at least a portion of the data for rewriting the at least a portion of the data to the tape volume;
 determine, after the repositioning, a current position of the tape volume; and
 determine, based on the current position of the tape volume, whether the rewrite to the tape volume is allowed.

18. The apparatus of claim 17, wherein the logic is configured to cause the processor to:
 receive a positional indicator prior to repositioning the tape volume; and
 enable positional write protection in response to receiving the positional indicator;
 wherein the positional write protection is enabled prior to repositioning the tape volume; and
 wherein the error includes an interface control check.

19. The apparatus of claim 17, wherein the rewrite to the tape volume comprises retrying a failed channel program.

20. A computer program product for protecting overwrite of a tape volume, the computer program product comprising a computer readable storage medium having program instructions embodied therewith, the program instructions executable by a controller to cause the controller to perform a method comprising:
 detect, by the controller, an error while writing data to a tape volume;
 reposition the tape volume for recovering from the error;
 receive, after the repositioning, at least a portion of the data for rewriting the at least a portion of the data to the tape volume;
 determine, by the controller after the repositioning, a current position of the tape volume; and
 determine, by the controller based on the current position of the tape volume, whether the rewrite to the tape volume is allowed.

* * * * *